Nov. 11, 1924.　　　　　　　　　　　　　　　　1,515,043
K. HENRICH
DEVICE FOR THE TREATMENT OF WOMEN'S ABDOMINAL COMPLAINTS
Filed Aug. 19, 1922
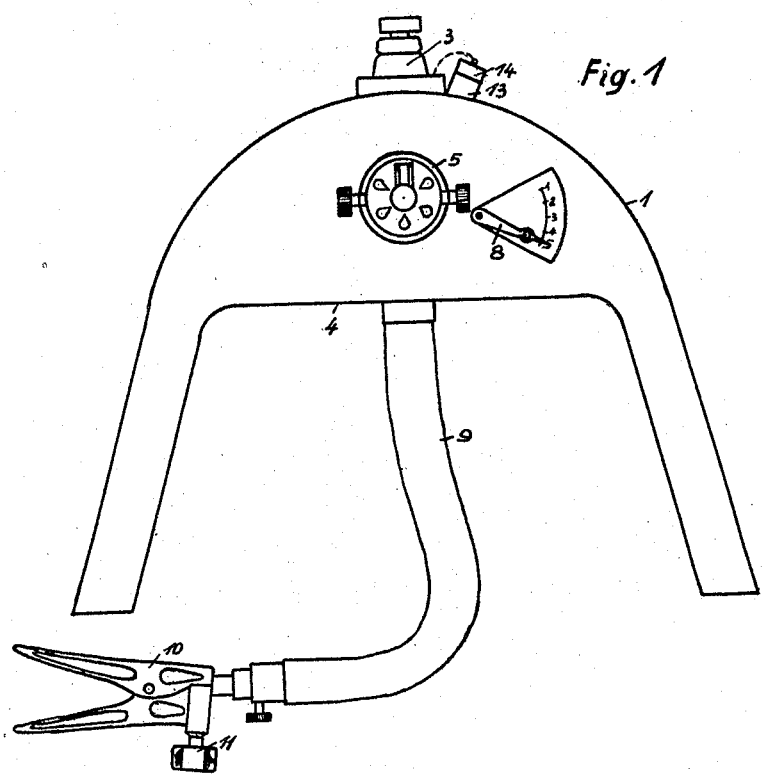
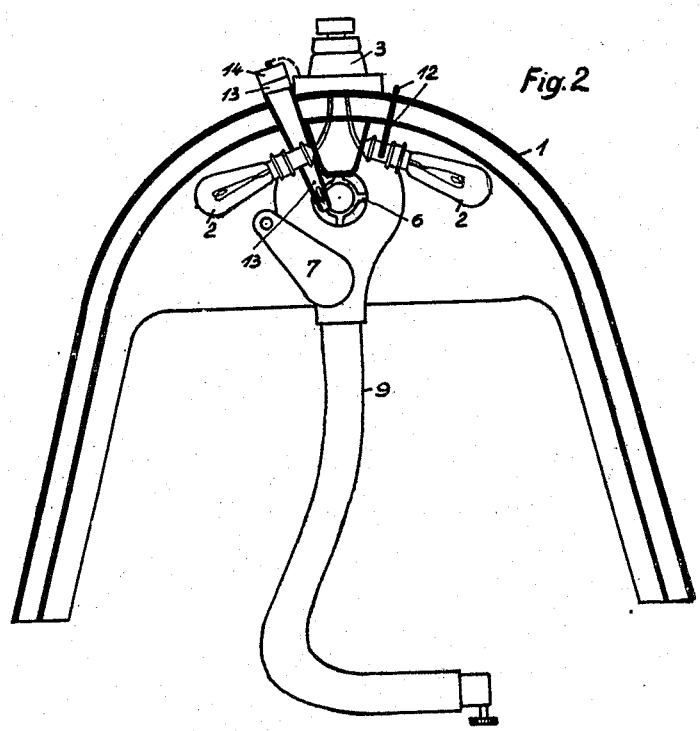

Patented Nov. 11, 1924.

1,515,043

UNITED STATES PATENT OFFICE.

KARL HENRICH, OF BAD-NAUHEIM, GERMANY.

DEVICE FOR THE TREATMENT OF WOMEN'S ABDOMINAL COMPLAINTS.

Application filed August 19, 1922. Serial No. 583,001.

*To all whom it may concern:*

Be it known that I, KARL HENRICH, a citizen of the German Republic, residing at Bad-Nauheim, Germany, have invented certain new and useful Improvements in Devices for the Treatment of Women's Abdominal Complaints, of which the following is a specification.

This invention relates to a device for the treatment of woman's abdominal complaints, especially of gonorrhoea and for other diseases of the pelvis, for instance, endometritis, and further for diseases of the adnexa, when exudations and other inflammations of any kind occur.

The device is based on the knowledge that the exciters of the gonorrhoea die off at 40°. Starting from this knowledge the device is constructed, according to the invention, in such a manner that, on the one hand, the mordific agents, the gonococci, are submitted to the direct action of hot air, and that further the abdomen is simultaneously heated from the outside in order to ensure a better and more uniform circulation of the blood through the whole abdomen from the vagina and from the skin. In this manner it is further ensured that diseased parts which are situated closer to the surface of the body than to the walls of the vagina can be more easily acted upon. Errors in the healing process are avoided which might be produced if, by local hyperæmia of certain parts, not sufficient blood is admitted in adjacent diseased parts of the body by reflex cramps of the vessels, whereby healing would evidently be impeded. The device consists of a local light-bath to be placed upon the abdomen and of a fan connected with the same and designed to blow by a conduit the warm or hot air directly into the vagina so that a constant air current of constant temperature may be produced in the same.

In the accompanying drawing the device according to the invention is shown in a preferred embodiment.

Fig. 1 in front elevation, and
Fig. 2 in section seen from the rear.

The device consists essentially of a commonly used light-bath 1 with the lamps 2 (Fig. 2) arranged on the same and adapted to be switched on and off from the outside by means of the switch 3 arranged, as shown in the form of construction given by way of example, upon the light-bath. The light-bath is partly shut off at the front and rear sides by the partition 4. A fan 6 (Fig. 2) driven by an electric motor 5 (Fig. 1) is fixed on the front wall. On the inner side of this wall 4 a trap 7 (Fig. 2) is arranged which may be adjusted with the aid of a lever 8 mounted on the outer surface of wall 4 in order to regulate the air current produced by the fan 6. The trap 7 is shown in Fig. 2 in the completely open position in which the strongest air current is produced. In the light-bath 1 an air conduit 9 consisting of a flexible tube (Fig. 2) is connected with the fan 6 so that the hot air produced in the light-bath 1 is injected into the vagina. A speculum 10 is attached at the free end of the flexible tube 9 designed for spreading the vagina according to requirement. The spreading of the speculum 10 is regulated by the adjusting screw 11 mounted in the same.

The operation of the device is as follows:—The air is heated in the light-bath 1 to a high temperature, the degree of which can be read upon a thermometer 12, which is bent at a right angle. The arm of the thermometer which carries the scale rests upon the outer wall of the light-bath 1. At 40 to 50° the fan 6 is switched on to blow the preliminarily heated air into the vagina with the aid of the flexible tube 9. As the vagina is spread out strongly by the speculum 10 each fold of the same is exposed to the action of the hot air so that all the mucous membrane of the same is rapidly dried. The air which flows back escapes through special ports.

In order to permit of blowing a powder into the vagina together with the heated air, a funnel 13 is arranged on the light-bath 1, the charging opening of this funnel being closed by the removable cap 14, the outflow end of which faces the fan 6.

I claim:—

1. A device for the treatment of women's abdominal diseases comprising in combination with a local light bath comprising electric incandescent lamps designed to be placed upon the abdomen, a fan connected with said light bath, a flexible tube for blowing the air heated in the light bath into the vagina and to produce thus in said vagina a constant air current of constant temperature.

2. A device for the treatment of women's abdominal diseases comprising in combination with a local light bath comprising electric incandescent lamps designed to be placed upon the abdomen, a fan connected with said light bath, a flexible tube for blowing the air heated in the light bath into the vagina and to produce thus in said vagina a constant air current of constant temperature, and a vaginal speculum at the free end of the flexible tube.

In testimony whereof I affix my signature in presence of two witnesses.

KARL HENRICH.

Witnesses:
T. K. ANDERSON,
ERWIN DIPPEL.